United States Patent [19] — [11] 4,085,126

McConnell et al. — [45] Apr. 18, 1978

[54] FATTY ALKANOLAMIDE DETERGENT COMPOSITIONS

[75] Inventors: Robert B. McConnell; Douglas W. Keuer, both of Janesville, Wis.

[73] Assignee: Ashland Oil, Inc., Ashland, Ky.

[21] Appl. No.: 724,033

[22] Filed: Sep. 17, 1976

[51] Int. Cl.² ............ C09F 5/00

[52] U.S. Cl. ............ 260/404; 252/117

[58] Field of Search ............ 260/404.5 ED, 404, 405; 252/117

[56] References Cited

U.S. PATENT DOCUMENTS

| | | | |
|---|---|---|---|
| 2,106,240 | 1/1938 | DeGroote | 260/404 |
| 2,382,612 | 8/1945 | DeGroote | 260/404 |
| 2,593,413 | 4/1952 | Cook et al. | 260/404.5 |
| 2,679,504 | 5/1954 | Katzmann | 260/404 |
| 2,944,030 | 7/1960 | Patton | 260/404.5 |

*Primary Examiner*—Winston A. Douglas
*Assistant Examiner*—John F. Niebling

[57] ABSTRACT

An alkanolamide composition is prepared from a detergent grade fatty acid via an intermediate in the form of an alkoxylated derivative thereof to provide a high active content product wherein the active component consists essentially of the alkanolamide.

6 Claims, No Drawings

FATTY ALKANOLAMIDE DETERGENT COMPOSITIONS

BACKGROUND OF THE INVENTION

1. Field of the Invention

This invention relates to surface active agents in the form of N and N,N hydroxyalkyl substituted higher organic amides.

2. Description of the Prior Art

The alkanolamides find extensive use in a variety of liquid detergent preparations wherein they primarily serve to promote or boost the foaming ability of the anionic surfactant component of the preparation as well as to stabilize the foam. Examples of such preparations include dishwashing liquids, shampoos, bubble bath formulations, light floor and wall cleaners, etc.

The alkanolamides are marketed in two grades for use in the aforesaid applications. One grade, referred to as a conventional Kritchevsky alkanolamides, encompasses those compositions containing about 65% alkanolamide and 35% of the corresponding alkanolamine. These products are prepared by reacting one mole of a fatty acid with two moles of the alkanolamine. The other grade, referred to as a superamide, contains in excess of 90% of the alkanolamide. Both grades are generally considered substantially equally effective for the purpose of foam promotion and stabilization. On the other hand, the respective types behave differently in physical characteristics in the various indicated formulations and consequently the choice between the two is usually predicated on the detergent formulator's particular requirement in this regard.

The superamides are customarily prepared by transesterifying the methyl ester of a detergent grade fatty acid with a primary or secondary alkanolamine, and generally the latter. The drawback associated with this manner of obtaining a superamide is that the reaction is difficult to complete to the extent whereby residual ester does not give rise to odor problems as well as adversely affecting the foam stabilization capabilities of the alkanolamide.

SUMMARY OF THE INVENTION

In accordance with the present invention an alkanolamide composition is provided having usefulness primarily as a foam booster and stabilizer for a variety of anionic surfactants in liquid detergent applications. The compositions contemplated are obtained by first reacting a $C_{12} - C_{16}$ saturated fatty acid with either ethylene oxide or terminal propylene oxide on an essentially equimolar basis. The resultant alkylene glycol ester is thereupon transesterified with either diethanolamine or monoethanolamine.

The alkanolamide compositions obtained in this manner are equivalent in performance to the superamides prepared from corresponding methyl esters on an equal weight basis in spite of their lower active content. They are particularly bland in odor characteristics and possess excellent storage stable integrity. Additionally, the compositions of this invention exhibit lower melting point characteristic than the counterpart superamides and hence are considerably easier to handle in compounding the indicated liquid detergents.

DESCRIPTION OF THE PREFERRED EMBODIMENTS

Lauric acid, myristic acid and palmitic acid are customarily used to prepare the alkanolamides whether of the superamide type or of the conventional Kritchevsky type. The preferred acid for this purpose is lauric acid or combinations of a major amount of lauric and a minor amount of either myristic or palmitic. Whole coconut fatty acids consisting essentially of $C_{12} - C_{16}$ fatty acids represents a suitable mixture particularly for preparing the mono alkanolamide types. As previously indicated, the alkanolamides of this invention are prepared by first alkoxylating the fatty acid and thereupon transesterifying with the alkanolamine. Accordingly, a variety of ways are applicable in accordance with this invention to achieve compositions in which the acyl moiety comprises a mixture of such residues. For example, the fatty acids can be blended and then alkoxylated followed by reaction with the alkanolamine. Alternatively, the alkoxylates of the fatty acids can be initially blended and thereupon transesterified or blends of the final alkanolamines can be effected.

In preparing the alkoxylate product essentially equal molar amounts of the fatty acids and ethylene or propylene oxide are reacted. The preferred alkylene oxide is 1,2-propane oxide. This reaction is carried out at a temperature of from about 125° to 200° C. and preferably in the order of about 140° C. Moderately elevated pressures are observed preferably in the order of about 5 atmospheres. The reaction is catalyzed by an alkali metal hydroxide of which about 0.5 wt. % based on the reactants is suitable. The reaction is carried out until there is less than about 1 wt. % of unreacted fatty acid.

Following the preparation of the alkoxylate as described, the alkylene glycol ester is thereupon transesterified with a slight molar excess of the alkanolamine in the presence of an alkali metal alkoxide catalyst, e.g., sodium methylate. The preferred combining ratio of these reactants is about 1.05 moles of the alkanolamine per mole of the ester. The transesterification reaction is preferably accomplished at atmospheric pressure using a nitrogen sparge and maintaining the temperature in the preferred range of from about 100° to 115° C. These reaction conditions are observed until the alkanolamine content is less than 10 wt. % of that originally charged. The reaction mixture is then cooled and vacuum stripped to remove volatiles.

The following working examples are primarily given to illustrate the best mode contemplated for implementing the present invention. All parts and percentages are by weight unless otherwise indicated.

EXAMPLE I

To a clean, dry Parr reactor were charged 995.5g (5 moles) of 95% pure lauric acid and 4g of 50% aqueous potassium hydroxide. The mixture was heated to 100° C. and vacuum stripped for 30 minutes at 15 mm to remove moisture. Propylene oxide in the amount of 290.5g (5 moles) was added at 140°-150° C. and 5 atmospheres pressure. Upon completion of the reaction, the free fatty acid content was 0.27 wt. %. The color of the product was 2 on the Gardner scale.

The above propylene glycol ester in the amount of 771g (3 moles), diethanolamine in the amount of 331g (3.15 moles) and 16.5g of 25 wt. % alcoholic sodium methylate were charged to a 2 liter flask equipped with a stirrer and reflux condensor. The reaction mixture was heated to 215° F. with a nitrogen sparge and held for 3 hours until the free diethanolamine content dropped to 9.5 wt. %. The reaction mixture was cooled to 70° C. and vacuum stripped for 1 hour at 13mm pressure. The resulting product after aging for 24 hours exhibited a Gardner color of 2+, an ester content of 2.0 wt. % and the free diethanolamine content of 6.8 wt. %.

EXAMPLE II

To a Parr reactor were charged 960.5g (4.2 moles) of 95% pure myristic acid and 4.8g of 50% aqueous potassium hydroxide. The mixture was heated to 105° C. and vacuum stripped for 30 minutes at 20mm to remove moisture. Propylene oxide in the amount of 244g (4.2 moles) was added at 138°-143° C. and 5 atmospheres pressure. Upon completion of the reaction, the free fatty acid content was 0.23 wt % and the color of the product was 1- on the Gardner scale.

A blend of 70 wt % of the glycol ester as prepared in Example I and 30 wt. % of the glycol ester of this example totalling 2144g (8 moles) was charged to a suitable reaction vessel equipped with a stirrer and reflux condensor. To the ester blend were added 882.4g (8.4 moles) of diethanolamine and 61g of 25 wt. % alcoholic sodium methylate. The reaction mixture was heated to 101°-107° C. and reacted 4.5 hours with a nitrogen sparge until the free diethanolamine content dropped to 10.2 wt. %. The mixture was cooled to 70° C. and vacuum stripped for 2 hours at 15mm pressure. The final product exhibited a Gardner color of 2+ and a 8.4 wt. % free diethanolamine content. After aging for 24 hours the diethanolamine content was 7.2 wt. % and the ester content was 2.4 wt. %.

EXAMPLE III

The primary purpose of this example is to exemplify the manner in which the alkanolamide compositions of Examples I and II are conventionally utilized and to compare the performance thereof vis-a-vis counterpart superamides. Commercial products of the latter type include VARAMIDE ML1 [Lauric (95%) diethanolamide] and VARAMIDE ML4 [Lauric/Myristic (70:30) diethanolamide]. Melting point data as well as surface tension and interfacial tension values for the various test materials are firstgiven in the following Table I.

TABLE I

| | SURFACE TENSION (0.025% solids) | INTERFACIAL TENSION (0.025 % solids) | MELTING POINT |
|---|---|---|---|
| EXAMPLE I | 33.1 DYNES/CM | 6.5 DYNES/CM | 94 ° F |
| VARAMIDE ML1 | 30.3 DYNES/CM | 10.0 DYNES/CM | 112° F |
| EXAMPLE II | 33.1 DYNES/CM | 7.0 DYNES/CM | 16° F |
| VARAMIDE ML4 | 30.1 DYNES/CM | 9.8 DYNES/CM | 96° F |

Three types of detergent systems were prepared in which the above-indicated alkanolamides were included as the foam boosting and stabilizing component. The composition in parts by weight of the respective systems follows:

| SYSTEM #1 | SYSTEM #2 | SYSTEM #3 |
|---|---|---|
| 15 - TAS* | 15 - SLS** | 12 - SLES*** |
| 4 - TEST ALKANOLAMIDE | 4 - TEST ALKANOLAMIDE | 2 - NP9**** |
| 81 - WATER | 81 - WATER | 4 - TEST ALKANOLAMIDE |
| | | 82 - WATER |

*Triethanolamine salt of lauryl sulfate
**Sodium lauryl sulfate
***Sodium lauryl ether sulfate
****Nine mole ethylene oxide adduct of nonylphenol The detergent systems noted above were evaluated in accordance with the Ross Miles test, the Shampometer test (J. Soc. Cosmet. Chem. 5 1954(3)29) and a dishwashing test. In the dishwashing test standard soiled dinner plates were washed in 45° C. tap water having 150 pp hardness using 6 gms of the detergent solution in 10 l of water and foamed to a standard height. The plates were washed two at a time until the foam covered half of the surface of the wash water. Further details with respect to the aforesaid tests together with the results obtained are set forth in the following Table II.

TABLE II

| ALKANOLAMIDE | ROSS MILES (mm) 0.1% ACTIVE - 23° C. INITIAL | ROSS MILES (mm) 0.1% ACTIVE - 23° C. 5 MIN. | SHAMPOMETER (ml) 1.0% ACTIVE - 23° C. INITIAL | SHAMPOMETER (ml) 1.0% ACTIVE - 23° C. 5 MIN. | DISHWASHING TEST TOTAL PLATES WASHED |
|---|---|---|---|---|---|
| | DETERGENT SYSTEM #1 | | | | |
| EXAMPLE I | 169 | 162 | 40 | 34 | 13 |
| VARAMIDE ML1 | 166 | 168 | 28 | 26 | 13 |
| EXAMPLE II | 158 | 154 | 41 | 41 | 14 |
| VARAMIDE ML4 | 155 | 160 | 31 | 30 | 16 |
| | DETERGENT SYSTEM #2 | | | | |
| EXAMPLE I | 169 | 169 | 45 | 42 | 17 |
| VARAMIDE ML1 | 166 | 168 | 49 | 48 | 18 |
| EXAMPLE II | 172 | 164 | 52 | 48 | 17 |
| VARAMIDE ML4 | 168 | 169 | 34 | 32 | 18 |
| | DETERGENT #3 | | | | |
| EXAMPLE I | 150 | 147 | 34 | 30 | 16 |
| VARAMIDE ML1 | 142 | 144 | 38 | 35 | 16 |
| EXAMPLE II | 149 | 146 | 23 | 21 | 15 |

TABLE II-continued

| | | | | | |
|---|---|---|---|---|---|
| VARAMIDE ML4 | 140 | 143 | 14 | 12 | 14 |

What is claimed is:

1. A fatty alkanolamide composition prepared by reacting substantially equimolar amounts of a $C_{12}$–$C_{16}$ saturated fatty acid and an alkylene oxide selected from the group consisting of ethylene oxide and 1,2-propylene oxide and thereupon transesterifying a mole of the resultant alkylene glycol ester with about a mole of diethanolamine or monoethanolamine.

2. A composition in accordance with claim 1 wherein said alkylene oxide is 1,2-propylene oxide.

3. A composition in accordance with claim 2 wherein the alkanolamine is diethanolamine.

4. A composition in accordance with claim 3 wherein said fatty acid is lauric acid.

5. A composition in accordance with claim 3 wherein said fatty acid is whole coconut fatty acid.

6. A composition in accordance with claim 3 wherein said fatty acid is a blend of a major amount of lauric and a minor amount of myristic.

* * * * *